(12) United States Patent
Bahali et al.

(10) Patent No.: US 7,421,599 B2
(45) Date of Patent: Sep. 2, 2008

(54) POWER MANAGEMENT SERVER AND METHOD FOR MANAGING POWER CONSUMPTION

(75) Inventors: Sumanta K. Bahali, Cary, NC (US); Warren D. Bailey, Pittsboro, NC (US); Jimmy G. Foster, Sr., Morrisville, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/148,692

(22) Filed: Jun. 9, 2005

(65) Prior Publication Data

US 2007/0005994 A1     Jan. 4, 2007

(51) Int. Cl.
G06F 1/00 (2006.01)
G06F 1/26 (2006.01)
G06F 1/32 (2006.01)
G06F 11/30 (2006.01)

(52) U.S. Cl. ............ 713/320; 713/300; 713/310; 713/340; 709/208; 709/223; 700/295

(58) Field of Classification Search ............ 713/300, 713/310, 320, 340; 709/208, 223; 700/295
See application file for complete search history.

(56) References Cited

U.S. PATENT DOCUMENTS

| | | | |
|---|---|---|---|
| 5,249,297 A | 9/1993 | Brockmann et al. | |
| 5,251,320 A | 10/1993 | Kuzawinski et al. | |
| 5,307,409 A | 4/1994 | Driscoll | |
| 5,398,244 A | 3/1995 | Mathews et al. | |
| 5,483,656 A * | 1/1996 | Oprescu et al. | 713/320 |
| 5,579,524 A | 11/1996 | Kikinis | |
| 5,652,893 A | 7/1997 | Ben-Meir et al. | |
| 5,719,800 A | 2/1998 | Mittal et al. | |
| 5,724,592 A | 3/1998 | Garner | |
| 5,752,050 A | 5/1998 | Hemandez et al. | |
| 5,764,913 A | 6/1998 | Jancke et al. | |
| 5,787,294 A | 7/1998 | Evoy | |
| 5,987,614 A | 11/1999 | Mitchell | |
| 6,029,006 A | 2/2000 | Alexander et al. | |
| 6,266,735 B1 | 7/2001 | Isobe | |
| 6,301,527 B1 | 10/2001 | Butland et al. | |
| 6,377,874 B1 | 4/2002 | Ykema | |
| 6,477,483 B1 | 11/2002 | Scarlat et al. | |
| 6,525,895 B2 | 2/2003 | Wakui | |
| 6,564,274 B1 | 5/2003 | Heath et al. | |

(Continued)

*Primary Examiner*—Mark Connolly
(74) *Attorney, Agent, or Firm*—Cynthia S. Byrd; Dillon & Yudell LLP

(57) ABSTRACT

A power management server and method for managing power consumption is disclosed. According to one embodiment, a power management server data processing system is provided, where the power management server data processing system comprises a power management communication port to communicatively couple the power management server data processing system to a power-managed server data processing system and a system management processor coupled to the power management communication port. In the described embodiment, the system management processor comprises power management logic configured to receive power management data from the power-managed server data processing system, to generate a power management command utilizing the power management data, and to transmit the power management command to the power-managed server data processing system utilizing the power management communication port. Moreover, the power management data of the described embodiment comprises power management capability data.

3 Claims, 8 Drawing Sheets

U.S. PATENT DOCUMENTS

| | | |
|---|---|---|
| 6,564,328 B1 | 5/2003 | Grochowski |
| 6,564,332 B1 | 5/2003 | Nguyen et al. |
| 6,643,771 B2 | 11/2003 | Tsushima et al. |
| 6,701,446 B2 | 3/2004 | Tsern et al. |
| 6,708,278 B2 | 3/2004 | Howard et al. |
| 6,802,014 B1 | 10/2004 | Suurballe |
| 6,836,849 B2 | 12/2004 | Brock et al. |
| 6,931,553 B1 | 8/2005 | Plante et al. |
| 2002/0007463 A1 | 1/2002 | Fung |
| 2002/0062454 A1 | 5/2002 | Fung |
| 2003/0037268 A1 | 2/2003 | Kistler et al. |
| 2003/0055969 A1 | 3/2003 | Begun et al. |
| 2003/0061448 A1 | 3/2003 | Rawson, III |
| 2003/0065961 A1 | 4/2003 | Koenen |
| 2003/0131119 A1 | 7/2003 | Noonan et al. |
| 2005/0102544 A1 | 5/2005 | Brewer et al. |
| 2006/0168416 A1 | 7/2006 | Kessels et al. |
| 2007/0005994 A1 | 1/2007 | Bahali et al. |

* cited by examiner

POWER MANAGEMENT SERVER AND METHOD FOR MANAGING POWER CONSUMPTION

CROSS-REFERENCE TO RELATED APPLICATIONS

The present application is related to the following United States Patent Applications, which are assigned to the assignee hereof and incorporated herein by reference in their entireties and for all purposes:

U.S. patent application Ser. No. 11/148,579, entitled, "DISTRIBUTED SYSTEM AND METHOD FOR MANAGING POWER USAGE AMONG SERVER DATA PROCESSING SYSTEMS," filed concurrently herewith;

U.S. patent application Ser. No. 11/148,581, entitled, "POWER-MANAGED SERVER AND METHOD FOR MANAGING POWER CONSUMPTION," filed concurrently herewith;

U.S. patent application Ser. No. 11/148,580, entitled, "SYSTEM AND METHOD FOR MANAGING POWER USAGE OF A DATA PROCESSING SYSTEM SUBSYSTEM," filed concurrently herewith;

U.S. patent application Ser. No. 11/148,934, entitled, "HIERARCHICAL SYSTEM AND METHOD FOR MANAGING POWER USAGE AMONG SERVER DATA PROCESSING SYSTEMS," filed concurrently herewith.

BACKGROUND

1. Technical Field

Embodiments of the present invention relate generally to power allocation within a data processing system and more particularly to a power management server and method for managing power consumption among a plurality of server data processing systems.

2. Description of the Related Art

Recently, the development of data processing systems (e.g., computer systems) has begun to focus on the amount of electrical power consumed rather than solely on more traditional aspects such as the volume of data stored, the speed at which operations are completed, or the flexibility of the types of operations which may be performed. This is true not only in the context of mobile data processing system devices where the weight and charge/discharge cycle time of portable power sources such as battery cells is critical, but also in the context of desktop or large data processing systems not intended to be user-portable.

In the larger data processing system context, a reduction in power consumption may be necessary to achieve eligibility for certain environmental impact standards or labels such as the "Energy Star" rating system established by the United States Department of Energy and the Environmental Protection Agency or merely to reduce the cost of operating a data processing system associated with system power. The issue of power management is even more critical in larger scale data processing systems such as supercomputers, parallel processing data processing systems (e.g., massively parallel processing systems), server data processing system "farms", and rack servers.

A rack server is a data processing system including a storage rack element into which one or more server data processing system modules are inserted. In a typical configuration, a single power input or source (e.g., a conventional wall-mounted power outlet) is coupled to each storage rack element with power being distributed or subdivided among the elements of the rack as needed (e.g., via a power distribution unit or "PDU").

The available space of a rack server is typically defined in terms of rack units or "U" with storage rack elements being available in a variety of sizes (e.g., 14U, 25U and 42U). Conventional server data processing system modules are measured in terms of the number of rack units they occupy, with rack density being determined by the number of "U" occupied within a storage rack element. Until recently, a conventional rack server would include a 42U rack having 6 7U-sized server data processing system modules. More modern rack servers may frequently include 21 2U-sized server data processing system modules, 42 1U-sized server data processing system modules, or even 84 half rack unit-sized or "blade" server data processing system modules.

Each server data processing system module typically includes a separate power supply element and consequently, as the number of modules in a rack server increases, the amount of power consumed may increase disproportionately as compared with a rack server including a smaller number of larger modules. Electrical power consumption in such power-dense rack servers may be so great that a single power input/source, server farm, or data center may be unable to provide sufficient power to operate all modules as needed.

In a conventional data processing system, power management is frequently accomplished by reducing rail or source voltages applied to a processing element (e.g., a central processing unit) or the frequency of a clock signal applied to such a processing element in response to a user selection of a particular power "mode" (e.g., maximum system performance or minimum power consumption mode) or following the detection of an external event such as the application or removal of an external (e.g., alternating current) power source. While such power management techniques may result in a reduction in the amount of power consumed, they either require explicit user input which may not accurately reflect the power consumption needs of a data processing system affected or operate completely independently of data processing system power requirements based upon external events. Moreover, such power management techniques provide no manner to coordinate the power consumption of multiple data processing systems which depend on a single power input or source.

SUMMARY

A power management server and method for managing power consumption are provided herein. According to one embodiment, a power management server data processing system is provided for managing power consumption among a plurality of server data processing systems, where the power management server data processing system comprises a power management communication port to communicatively couple the power management server data processing system to a power-managed server data processing system of the plurality of server data processing systems and a system management processor coupled to the power management communication port. In the described embodiment, the system management processor comprises power management logic configured to receive power management data from the power-managed server data processing system, to generate a power management command utilizing the power management data, as well as to transmit the power management command to the power-managed server data processing system utilizing the power management communication port.

Moreover, the power management data of the described embodiment comprises power management capability data.

The foregoing is a summary and thus contains, by necessity, simplifications, generalizations and omissions of detail; consequently, those skilled in the art will appreciate that the summary is illustrative only and is not intended to be in any way limiting. As will also be apparent from the accompanying description, the operations disclosed herein may be implemented in a number of ways including implementation in hardware, software, firmware, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of similar reference symbols in different drawings is intended to indicate similar or identical items.

DETAILED DESCRIPTION OF AN ILLUSTRATIVE EMBODIMENT

Figure 1A:
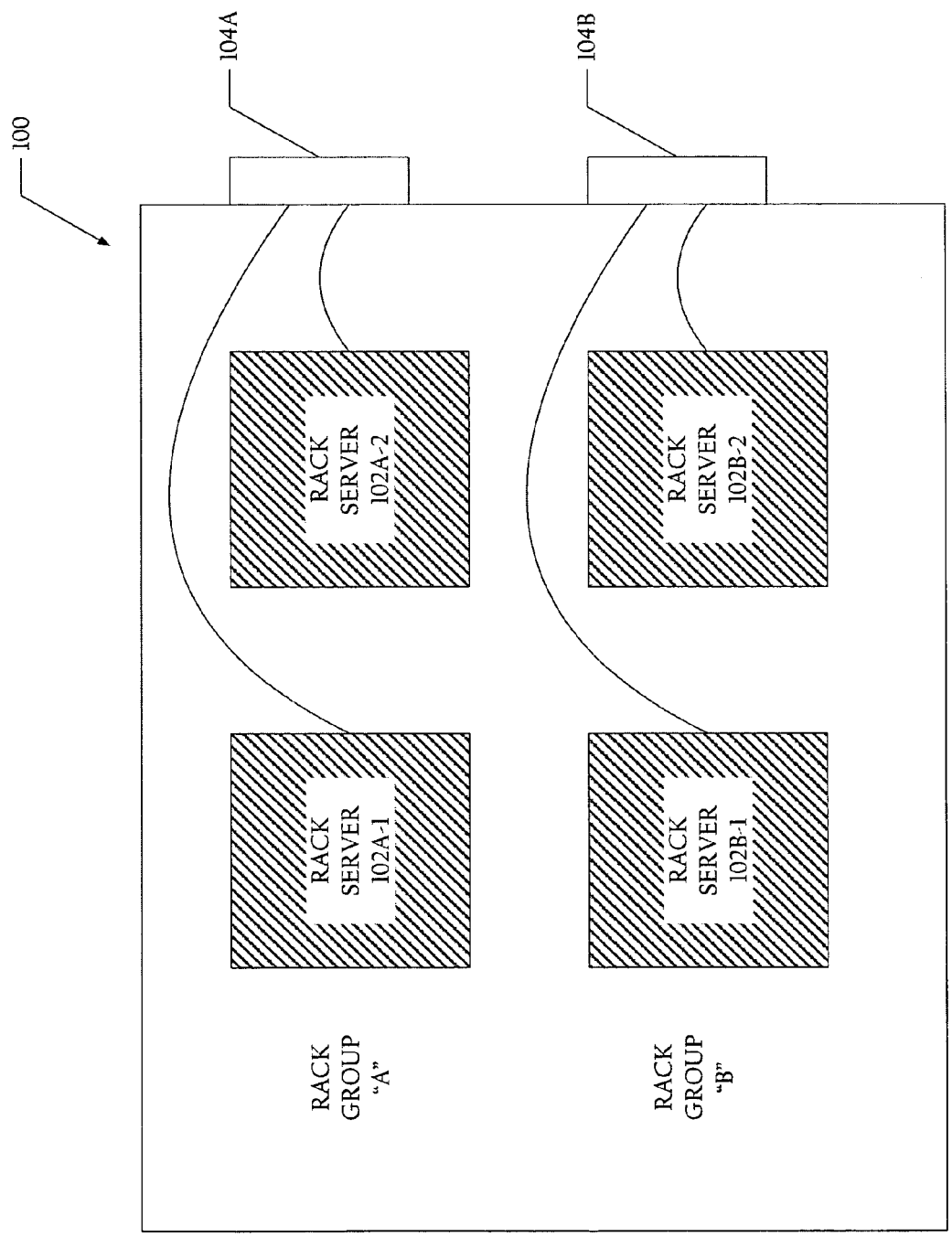
FIG. 1A is a plan view of the server farm including a plurality of rack servers as set forth in one or more embodiments of the present invention.

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a power management server and method for managing power consumption among a group or plurality of server data processing systems within a data processing system such as a rack server. Within the present description, the term "power" is intended to indicate electrical power or data or a factor which represents or specifies electrical power or is proportional to electrical power (e.g., current, voltage, duty cycle, or the like). According to one embodiment, power consumption is managed among a group or plurality of server data processing systems including one or more power-managed server data processing systems and at least one power-management server data processing system by the power management server data processing system.

In an alternative embodiment, power management may be accomplished using a separate power management device or element rather than a server data processing system incorporating such functionality as described herein. As all server data processing systems of a group sharing a single power input or source do not typically consume the maximum rated or required quantity of power substantially simultaneously, embodiments of the present invention enable a group (e.g., a rack, server farm, or data center) of server data processing systems to be supplied with significantly less power than the maximum configuration would require, while preserving application performance on all server data processing systems.

To determine the level of power management which needs to be applied, power management data is requested from and supplied by the described power-managed server data processing system(s) to either a power management server data processing system or discrete power management device. Such power management data may comprise any data relevant to the management or regulation of server data processing system power consumption and in one or more embodiments includes power management capability data such as data specifying minimum, maximum, and average or "typical" required power, data specifying a proportion or percentage of power (e.g., maximum required power) to which a corresponding power-managed server data processing system may regulate or "throttle" power consumption. In other embodiments of the present invention, power management data may include data specifying a static (e.g., installation) or dynamic priority level as further described herein.

In one embodiment of the present invention, a single server data processing system includes both power management logic and power-managed logic within a system management processor. Consequently, the single server data processing system may act as both a power management server data processing system and a power-managed server data processing system, communicating power management data among its system elements, logic or processes and acting to self-regulate power consumption.

While a group or plurality of server data processing systems have been described herein primarily as server data processing system modules within the context of a rack server, embodiments of the present invention are not limited to use in conjunction with rack servers or component modules thereof. For example, in alternative embodiments of the present invention, a group or plurality of server data processing system may comprise one or more free-standing, enclosed server data processing systems or a combination of free-standing, enclosed server data processing systems and server data processing system modules of a rack or blade server. According to one embodiment, a plurality of group of server data processing systems is defined by coupling to a particular power input or source (e.g., a wall outlet, a power line/link, a power substation, or the like).

In other embodiments of the present invention, static and/or static and dynamic priority values may be utilized to determine in what manner power consumption is managed or regulated. Data specifying a static priority value associated with a server data processing system remains constant for some definite period of time during which data specifying a dynamic priority value associated with the same server data processing system may vary. For example, a static priority value may be determined based upon the order in which server data processing systems of a plurality or group are installed or brought into an operational state. Consequently, static priority values may remain constant until some physical data processing system reconfiguration occurs. In other embodiments of the present invention, other appropriate metrics may be used for establishing static priority (e.g., device class, class of service requested by an associated customer, or the like).

By contrast, a dynamic priority value may reflect an immediate need for greater power or operational/execution speed and/or reduced power management. According to one embodiment of the present invention, a dynamic priority value is utilized merely to indicate a desire to reduce or eliminate the application of power management techniques (e.g., throttling) for some period of time at a smaller level of granularity than is associated with static priority. For example, a dynamic priority value may be established or requested in association with a specific high priority operation or transaction (e.g., the critical section of an application program) to be performed by an application program on a server data processing system. According to one embodiment, although a dynamic priority level may be requested by or for a particular a server data processing system, an associated modification of power management may or may not be applied to that server data processing system depending on other system parameters (e.g., the operating state and/or static priority of the requesting server data processing system or other server data processing systems, the available power, or the like).

A dynamic priority value may be a binary indicator (i.e., either active or inactive) associated with a predetermined dynamic power management or consumption level (e.g., no power management, some modified maximum level beyond which power consumption may not be reduced, a fixed relationship with the power management applied to one or more other server data processing systems, or the like). Alternatively, a dynamic priority value may comprise data specifying a modified power management level (on the same or a separate scale as is utilized for static priority values) which may be combined with or supplant an existing static priority level designation.

FIG. 1A is a plan view of the server farm including a plurality of rack servers as set forth in one or more embodiments of the present invention. As shown from above, server farm 100 of the illustrated embodiment of FIG. 1A includes a number of "rack groups" (e.g., rack groups "A" and "B") each including a number of rack servers 102. Rack group "A" of the depicted embodiment includes rack servers 102A-1 and 102A-2 each coupled to a corresponding power source 104A. Similarly, rack group "B" of the depicted embodiment includes rack servers 102B-1 and 102B-2 each coupled to corresponding power source 104B. While a particular number and configuration of rack servers has been shown in FIG. 1A for illustrative purposes, in alternative embodiments of the present invention any number of rack servers (or other groups of server data processing systems), rack groups, and power sources may be implemented.

Figure 1B:
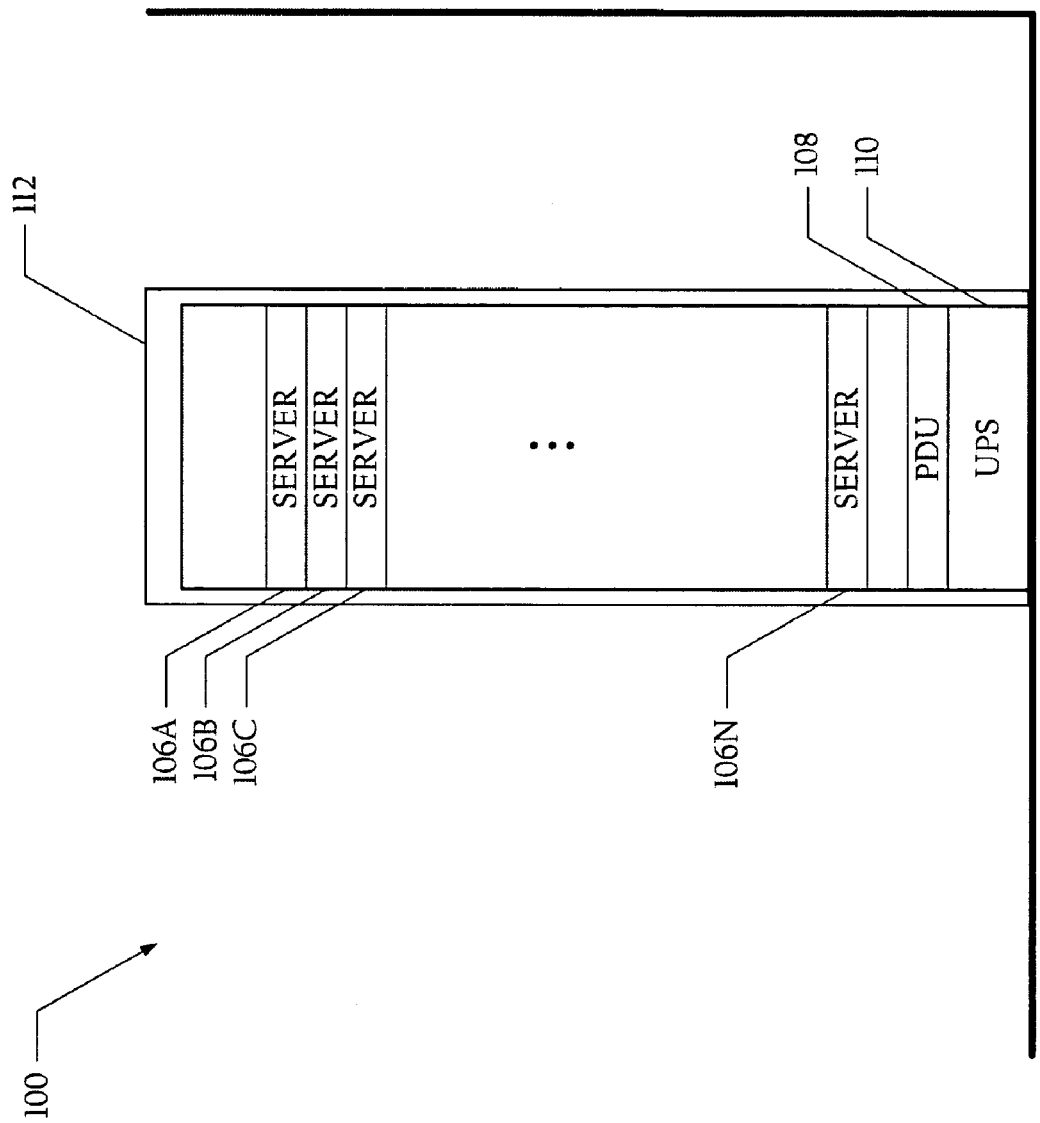
FIG. 1B is a front elevation view of a rack server of FIG. 1A.

FIG. 1B is a front elevation view of a rack server, such as rack server 102A-1 of FIG. 1A. The depicted rack server includes a plurality of server data processing systems (e.g., server data processing system modules 106A . . . 106N as shown) as well as a power distribution unit (PDU) 108 and an uninterruptible power supply (UPS) 110 disposed within a storage rack element 112. In the illustrated embodiment, server data processing system modules 106, PDU 108, and UPS 110 may be coupled with one another utilizing one or more connection media within storage rack element 112 (not illustrated). In alternative embodiments, power distribution among server data processing system modules 106A . . . 106N may be accomplished without the use of PDU 108 or UPS 110. Similarly, additional elements (e.g., input/output devices such as displays or keyboards, cooling devices, or the like) may be included within a rack server in other embodiments of the present invention.

Power distribution among server data processing system modules 106 is accomplished in the illustrated embodiment by coupling UPS 110 to a power supply (e.g., power source 104A of FIG. 1A) as well as to PDU 108. PDU 108 of the depicted embodiment is then in turn coupled to each of server data processing system modules 106A . . . 106N. To implement power management according to one embodiment of the present invention, at least one of server data processing system modules 106 is configured (e.g., activated, enabled, designated, selected or the like) as a power management server data processing system. Similarly, at least one of server data processing system modules 106 is configured as a power-managed server data processing system. In alternative embodiments of the present invention, power management server data processing system functionality may be implemented within PDU 108, UPS 110, or another rack server element or module.

Figure 1C:
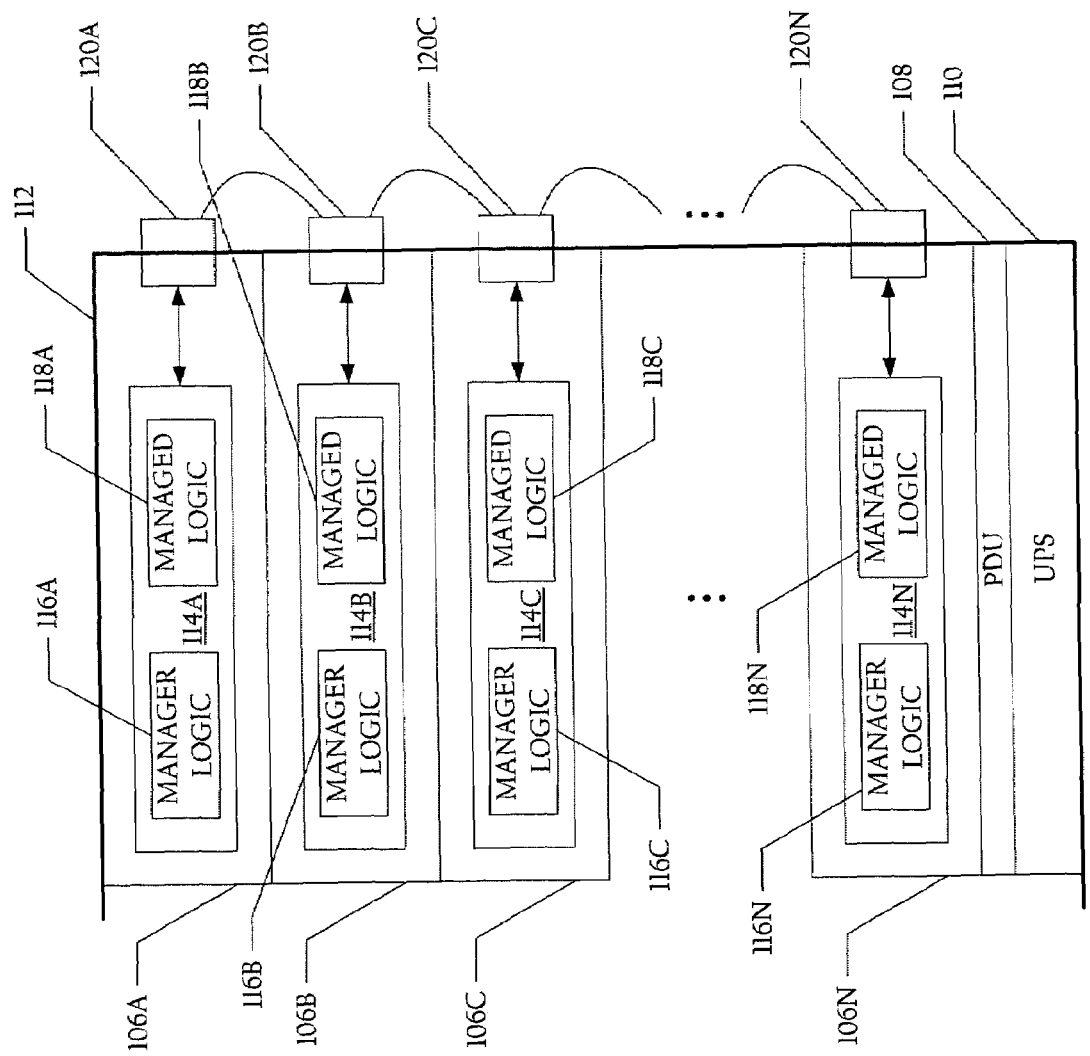
FIG. 1C is a cutaway side view of a rack server of FIG. 1A.

FIG. 1C is a cutaway side view depicting a rack server such as rack server 102A-1 of FIG. 1A. Disposed within storage rack element 112 of the illustrated rack server of FIG. 1C are each of server data processing system modules 106A . . . 106N, PDU 108, and UPS 110 as previously described herein with respect to FIGS. 1A and 1B. In the illustrated embodiment, each of server data processing system modules 106A . . . 106N includes a system management processor 114 and a power management communication port 120 coupled together as shown. Power management communication ports 120 enable server data processing system modules 106 to be communicatively coupled to one another via a communication link or media as has been illustrated. In the depicted embodiment of FIG. 1C, a serial or "daisy chain" connection method has been implemented. In alternative embodiments however, server data processing system modules 106 may be coupled together using any of a variety of topologies (e.g., a ring, bus, star, mesh, tree, or the like) and coupling means (e.g., via optical or electromagnetic and "wired" or "wireless" connection media).

Each system management processor 114 of the illustrated rack server embodiment includes power management logic 116 and power-managed logic 118. In operation, power management logic 116 requests and receives power management data from power-managed server data processing systems (e.g., modules) within the overall data processing systems and directs or manages power consumption or allocation among those server data processing systems which are power-managed via power management commands as further described herein. Conversely, power-managed logic 118 receives and responds to requests for such power management data as well as receiving power management commands and, where possible, satisfying those commands received.

In the illustrated rack server embodiment, each of server data processing system modules 106A . . . 106N further includes a power management operational mode selection or activation element (not illustrated) utilized to select whether an associated server data processing system module is configured as a power management or power-managed server element. Such a selection element may be physical (e.g., a switch) or a combination of physical and logical elements (e.g., a data storage element coupled with data such as a flag specifying an operational state). While each of server data processing system modules 106A . . . 106N has been depicted within FIG. 1C as including both power management and power-managed logic elements, in alternative embodiments of the present invention power, management logic may be incorporated into a smaller number of server data processing system modules, with all remaining power-managed server data processing system modules including only power-managed logic. Moreover, the term "logic" used herein, is intended to indicate any of a variety of data processing elements or modules including storage elements coupled with software, discrete or programmable hardware elements, or a combination thereof.

Figure 2:
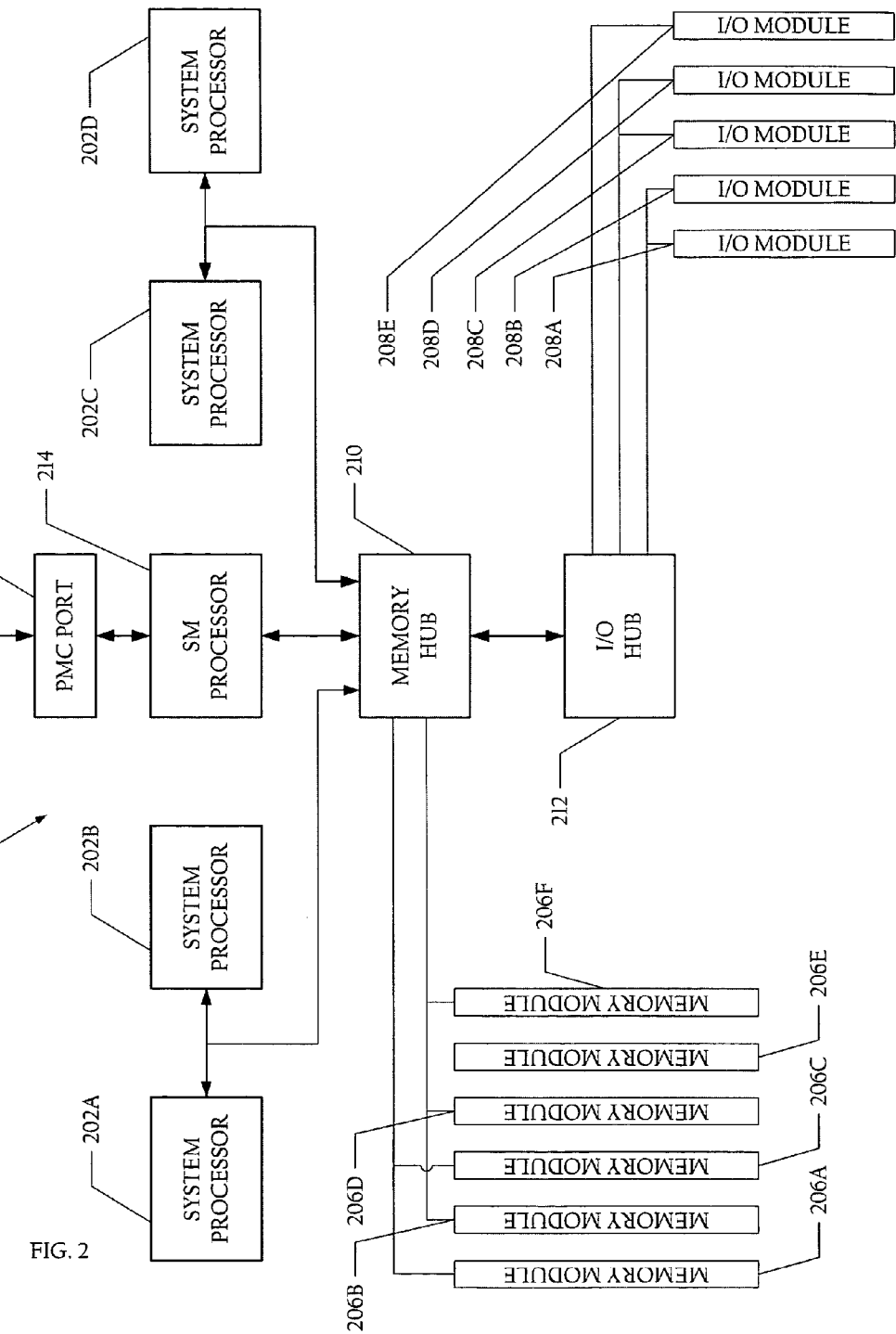
FIG. 2 is a high-level internal block diagram of a server data processing system according to an embodiment of the present invention.

FIG. 2 is a high-level internal block diagram of a server data processing system module according to an embodiment of the present invention. With reference to FIG. 2, a more detailed description of the internal components of a server data processing system module such as a component server data processing system module of rack server 102A-1 of FIG. 1A is provided. While a particular number and arrangement of elements has been illustrated with respect to server data processing system module 200 of FIG. 2, it should be appreciated that embodiments of the present invention are not limited to data processing systems having a particular number, type, or arrangement of components and so may encompass a wide variety of data processing system types, architectures, and form factors (e.g., network elements or nodes, personal computers, workstations, servers, or the like).

Server data processing system module 200 of the depicted embodiment includes a number of system processors 202A . . . 202D and a system management processor 214 coupled to memory modules 206A . . . 206F and input/output (I/O) modules 208A . . . 208E via a memory hub 210 and an I/O hub 212 as shown. Server data processing system module 200 of the illustrated embodiment further includes a power management communication port 220 as described further herein.

Memory (not illustrated) coupled with one or more of memory modules 206A . . . 206F may comprise any of a number of system memory-type storage elements such as random access memory (RAM), read-only memory (ROM), flash memory, and cache. Similarly, an I/O device (not illustrated) coupled with one or more of I/O modules 208A . . . 208E may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present invention may include software, data processing hardware, and various processing operations further described herein. The features and process operations of the present invention may be embodied in executable instructions embodied within a machine-readable medium such as a memory coupled with a memory module of memory modules 206A . . . 206F, a storage device, a communication device or medium, or the like. A machine-readable medium may include any mechanism that provides (i.e., stores and/or transmits) data in a form readable by a machine (e.g., server data processing system module 200). For example, a machine-readable medium may include but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as one or more of system processors 202A . . . 202D, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

The present invention has been described in the context of fully functional data processing system; however, those skilled in the art will appreciate that the present invention is capable of being distributed as a program product in a variety of forms and of being applied equally, regardless of the particular type of machine-readable or signal-bearing media used to carry out the distribution. Examples of signal-bearing media include recordable media such as floppy disks and CD-ROM, transmission type media such as digital and analog communications links, as well as media storage and distribution systems. Embodiments of the present invention may similarly be implemented using software modules used to perform certain operations or tasks. The described software modules may include script, batch, library, or other executable files and may be stored on a machine- or computer-readable medium. Thus, the modules may be stored within a computer system memory to configure a data processing or computer system to perform one or more functions of a software module. Various types of machine or computer-readable storage media may be used to store the modules discussed herein.

Figure 3:
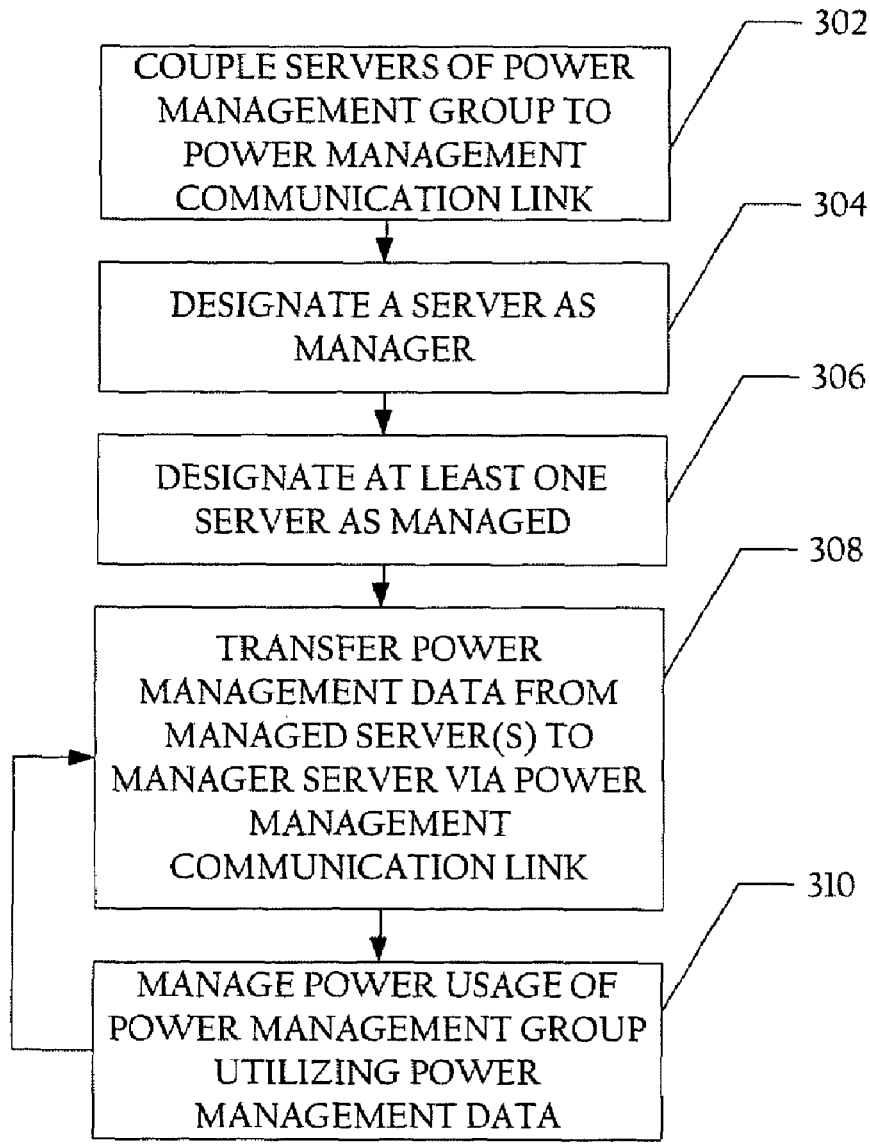
FIG. 3 illustrates a high-level flow diagram of a power management system configuration process according to an embodiment of the present invention.

FIG. 3 illustrates a high-level flow diagram of a power management system configuration process according to an embodiment of the present invention. In the illustrated process embodiment, power management is initiated by coupling server data processing systems of a power management group (e.g., all servers coupled to a single power source) to a power management communication link (process block 302). Such a coupling operation may be performed, for example, by linking a power management communication port of each of the relevant server data processing system using a communication link or medium (e.g., communication link cabling) such as is illustrated in FIG. 1C. In other embodiments of the present invention however, other methods of communicatively coupling such server data processing systems may be utilized as has been described herein.

While a distinct power management communication link or port connection has been illustrated with respect to various invention embodiments herein, in an alternative embodiment such a coupling may be performed using a power management communication link which is integral with an enclosure (e.g., a storage rack element) within which one or more of server data processing systems are disposed. Consequently, each server data processing system of a power management group may be coupled to a power management communication link by insertion into an enclosure. Once coupled to a power management communication link, a server data processing system of the power management group is then designated or selected to act as a power management server data processing system (process block 304).

According to one embodiment, (e.g., where all server data processing systems include power management as well as power-managed logic) the first server data processing system activated within the power management group is designated as the power management server data processing system. In other embodiments, selection or designation of a power management server data processing system or "power manager" is performed utilizing other data or attributes. For example, all server data processing systems may be polled to identify which, if any, include power management logic with a power manager being selected from the server data processing systems so identified. Moreover, the physical position of a server data processing system within the overall system may be examined to designate a server data processing system as power manager, for example to reduce the physical distance separating the power manager from the other server data processing systems of the power management group (and consequently the communication latency), or to reduce the likelihood that a power management server data processing system will become decoupled or disconnected from other servers of the system.

Thereafter, at least one server data processing system of the power management group is designated or selected to be "power-managed" (process block 306) as shown. In one or more embodiments of the present invention, a selection or designation of a power management and/or power-managed server data processing system may be performed utilizing a power management operational mode selection or activation element as previously described herein. Once selected, all power-managed server data processing systems then transfer power management data (e.g., power management capability data as previously described herein) to the power management server data processing system of the power management group via the power management communication link (process block 308). Power consumption of one or more server data processing systems of the power management group may then be managed or regulated utilizing the transferred power management data (process block 310). Additional or modified power management data (e.g., resulting from the association of additional server data processing systems with the power management group or changes to existing server data processing systems) is then transferred and additional power management operations are performed as appropriate.

Figure 4A:
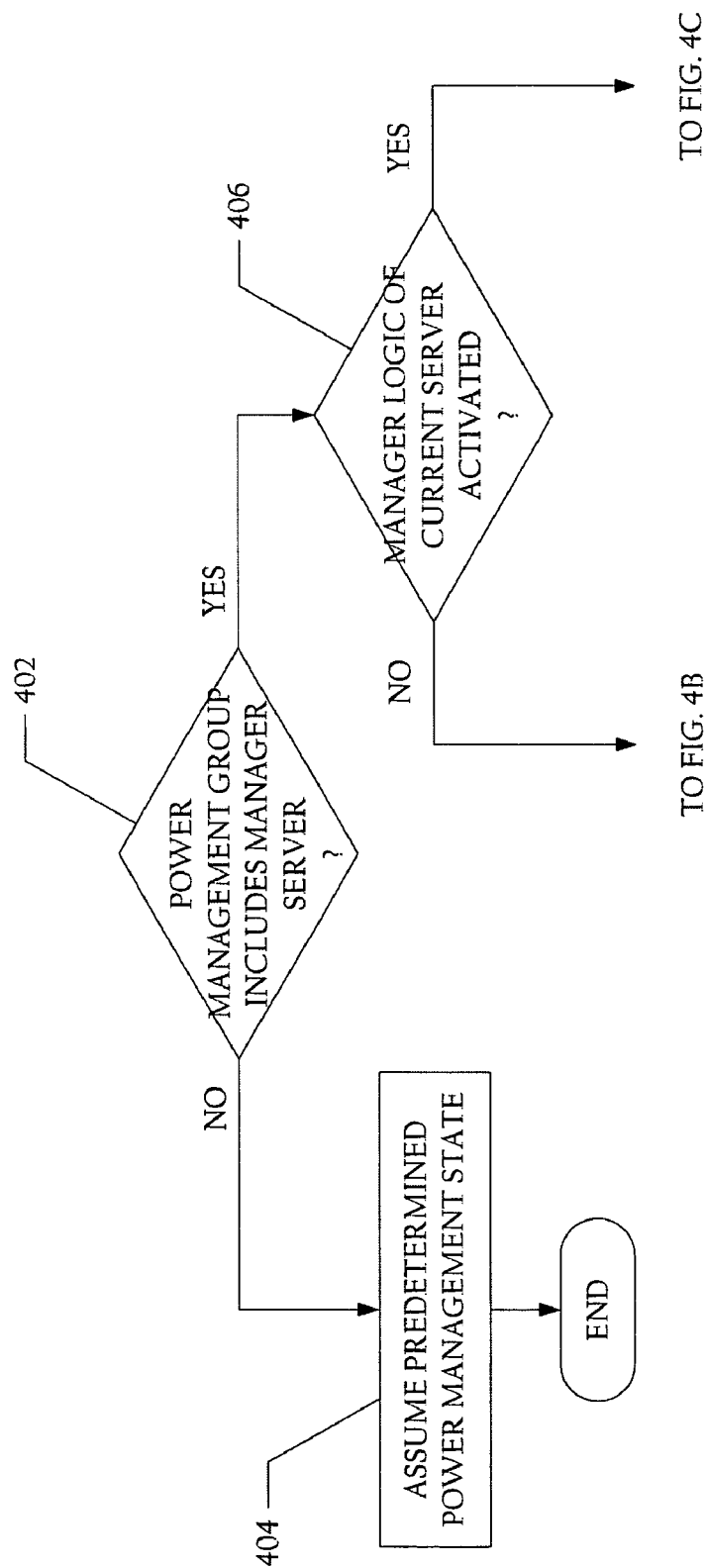
FIGS. 4a-4c illustrate a high-level flow diagram of an operational process of a power management-enabled server data processing system according to an embodiment of the present invention.
Figure 4B:
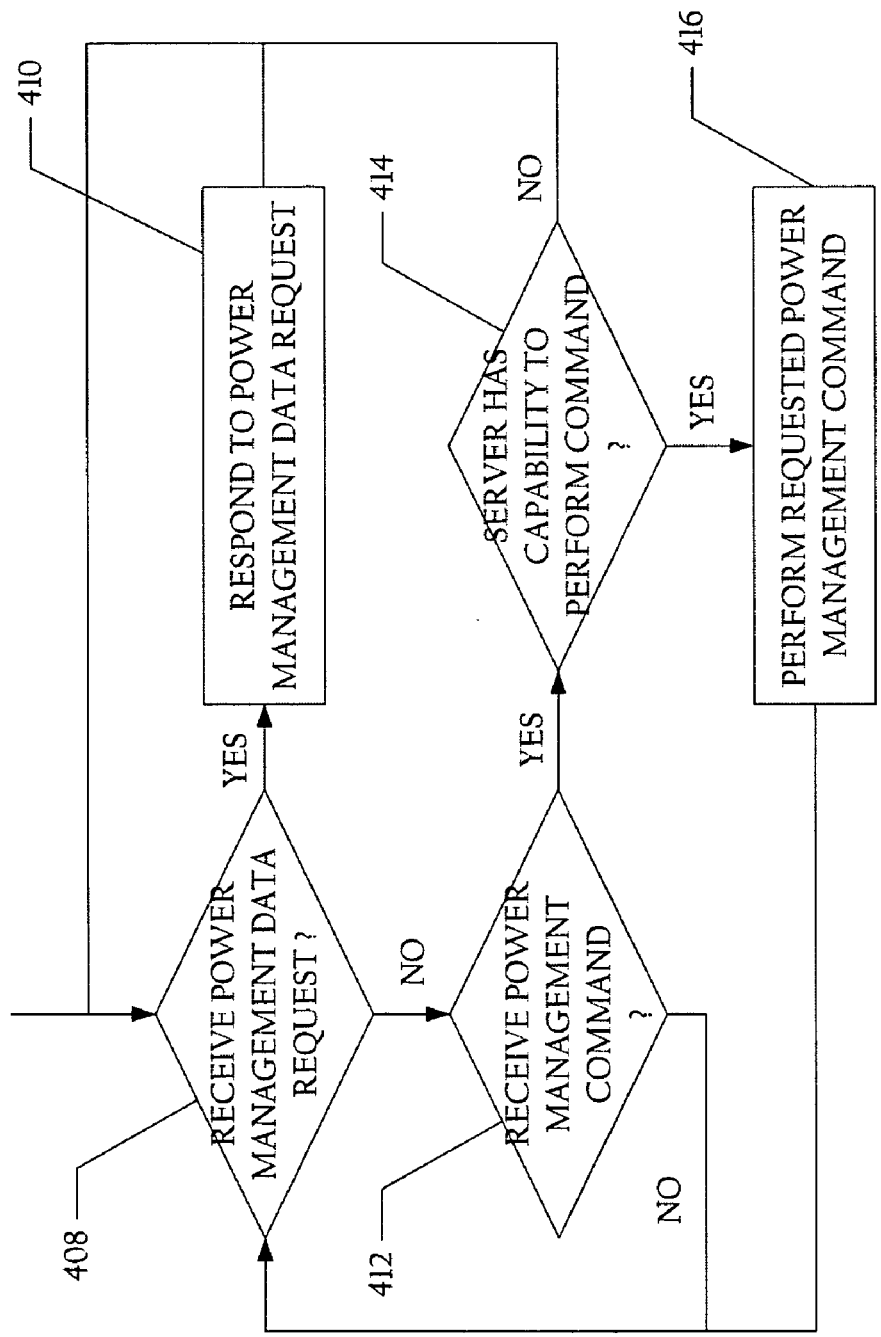
Figure 4C:
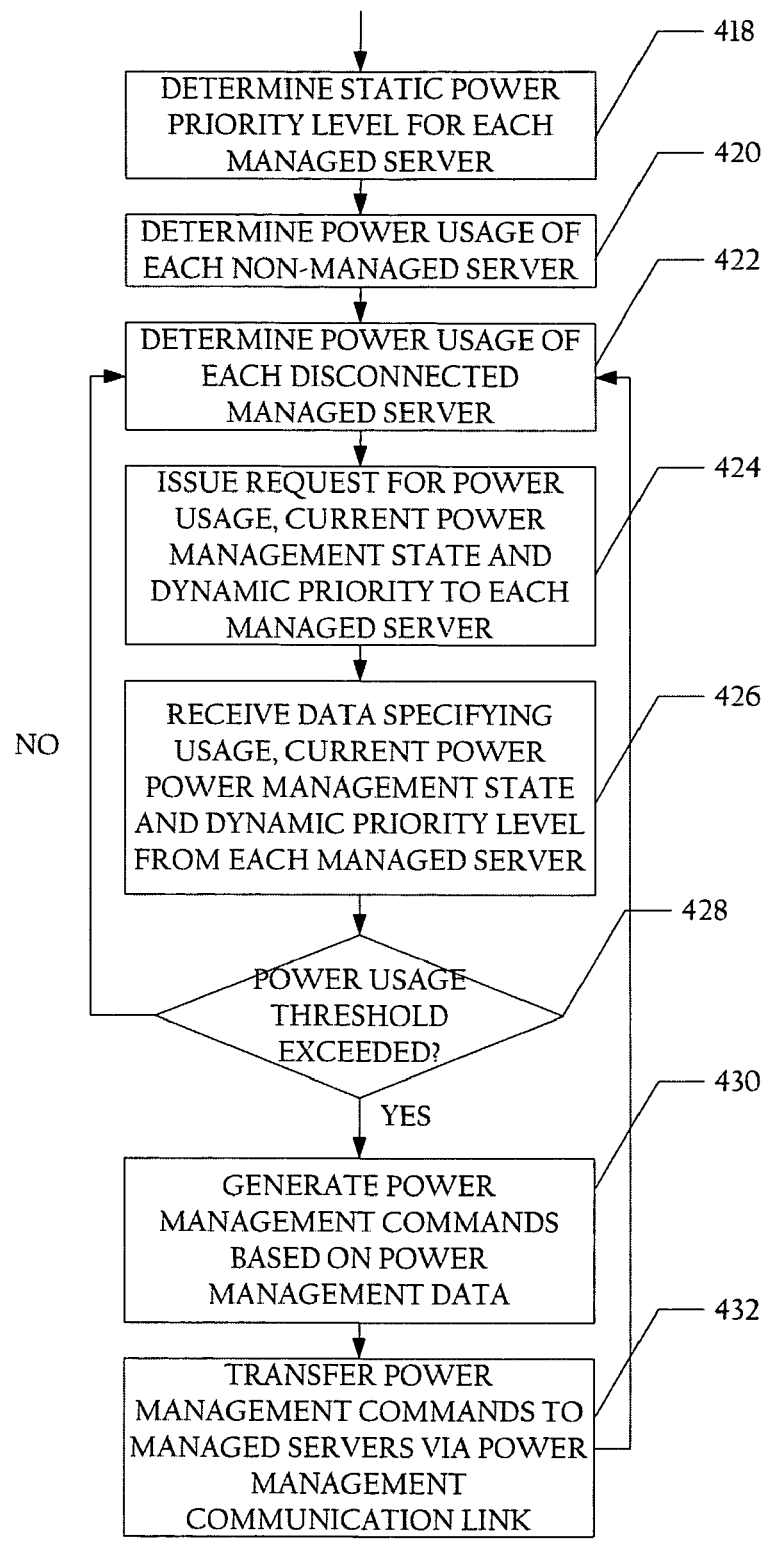

FIGS. 4a-4c illustrate a high-level flow diagram of an operational process of a power management-enabled server data processing system according to an embodiment of the present invention. Such an operational process may be embodied, in one embodiment, within a software application, routine, process, or the like stored within and executed from a machine-readable medium such as a server data processing system memory element of a power management-enabled (e.g., power management or power-managed server data processing system). With reference to the figures and in particular referring to FIG. 4a, a determination is initially made whether a power management group with which the server data processing system performing the depicted process is associated includes a power management server data processing system (process block 402).

If a determination is made that no power management server data processing system exists within an associated power management group, the server data processing system performing the depicted operational process assumes a predetermined power management or consumption state (process block 404). No associated power management server data processing system may exist in any of a number of circumstances (e.g., an existing power management server data processing system has become disconnected, a power management server data processing system has not yet been designated or selected, the power management group has been configured to not include such a server, a power-managed server data processing system has become disconnected from the remainder of the power management group and consequently cannot identify a power management server data processing system, or the like).

While no further operations have been depicted with respect to FIG. 4A following the assumption of the described predetermined power management or consumption state, in alternative embodiments of the present invention any of a variety of such operations may be performed. For example, a server data processing system may subsequently poll the power management group (e.g., periodically) to determine whether a power management server data processing system has been activated or identified or another qualified server data processing system of the power management group may be designated or selected as a temporary or permanent power manager. When a failure to identify a power management server data processing system has resulted from the decoupling or disconnection of a power-managed device of a power management group, power management commands to other power-managed server data processing systems or operations of a power management server data processing system may be modified accordingly as described herein to account for a predetermined or "default" power management or consumption level.

If a determination is made that a power management server data processing system is associated with the power management group, the server data processing system performing the depicted process determines whether it is in fact that server by determining whether associated power management logic has been activated (process block 406). If a determination is made that associated power management logic has not been activated (and consequently that the current server data processing system is not a power-management server), the illustrated process embodiment is continued as illustrated in FIG. 4B. In an alternative embodiment, an additional operation may be performed in which a determination is made whether power-managed logic resident within the current server data processing system performing the depicted process has been explicitly activated. If the current server data processing system performing the depicted process embodiment is determined to be a power management server data processing system (having activated power management logic associated therewith), the illustrated process embodiment is continued as illustrated in FIG. 4C.

With reference now to the figures and in particular to FIG. 4B, a portion of an operational process of a power-managed server data processing system according to an embodiment of the present invention is illustrated. While the operation of power-management and power-managed server data processing systems have been separately depicted and described herein for simplicity, it should be appreciated that in embodiments of the present invention a power-management server data processing system may include activated power-managed logic which performs the operations described with respect to power-managed server data processing systems, acting to self-regulate power consumption. In the illustrated process embodiment, a determination is made whether a request for power management data (e.g., power management capability data) has been received (process block 408) for example from power management server data processing system. If a power management data request is determined to have been received, the power-managed server data processing system responds to the request (process block 410) providing requested data as appropriate.

If a determination is made that no request for power management data has been received, a determination is subsequently made whether a power management command has been received (process block 412) (e.g., from an associated power management server data processing system). If no power management command has been received, the illustrated process embodiment continues until a request for power management data or a power management command is determined to have been received as shown. Once a power management command is received however, a determination is made whether the receiving server data processing system has the capability to perform the requested power management command or operation (process block 414). The server data processing system receiving a power management command then performs the requested power management command (process block 416) and/or awaits further commands or data requests as shown.

With reference now to the figures and in particular to FIG. 4C, a portion of an operational process of a power-management server data processing system according to an embodiment of the present invention is illustrated. In the illustrated process embodiment, a static priority value for each power-managed server data processing system is initially determined (process block 418). Similarly, a power usage or consumption level is determined for each non-power management-enabled server data processing system (process block 420) for example, by identifying a default power consumption or management level determined for the overall data processing system or power management group. Consequently, in one embodiment of the present invention, the power consumption of such non-power management-enabled server data processing systems may be utilized in determining the power management or regulation (e.g., power management commands) to be applied to other associated power management-enabled server data processing systems.

Thereafter in the illustrated process embodiment, a power usage or consumption level of each power-managed server data processing system which has been disconnected or decoupled from the power management communication link to the power management server data processing system performing the depicted process is determined (process block 422). A request is then issued to each connected power-managed server data processing system for power management data such as current or average power usage or consumption, current power management state, and/or dynamic priority value or state (process block 426) and data specifying one or more of the requested attributes is received (process block 426).

Based upon such data received from power-managed server data processing systems, a determination is made whether or not a power usage threshold has been exceeded (process block 428). According to one embodiment of the present invention, a power-management server data processing system is configured at start-up (e.g., when added to an associated power management group or storage rack element) with power management group (e.g., rack server) power parameters such as the maximum amount of power that may be supplied and such power parameters are utilized in performing the described determination. If a power usage threshold has not been exceeded, the depicted process embodiment cycles to determine whether any previously-connected server data processing systems have become disconnected along with such newly-disconnected server data processing systems' power usage profiles (process block 422) and to request and receive updated power management data from all connected power-managed server data processing systems (process blocks 424 and 426, respectively) as shown.

If a determination is made that a power usage threshold has been exceeded however, one or more power management commands are generated based upon previously-received power management data (process block 430) and such power management commands are transferred, as appropriate, to power-managed server data processing systems within an associated power management group utilizing a power management communication link (process block 432). In various alternative embodiments of the present invention, power management commands as described herein may be applied individually to server data processing systems within a power management group, to a power management group as a whole, or a sub-group of server data processing systems within a power management group. Data specifying the power consumption of a power management group or server data processing system may also be transmitted (e.g., as a power usage report) to other elements or users within an associated data processing system or communications network.

Although the flow diagrams depicted in FIG. 3 and FIGS. 4*a*-4*c* indicate a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, additional process operations may be added where necessary in alternative embodiments of the present invention. For example, although the illustrated process embodiment depicts the transmission of power management commands to each power-managed server data processing system in a plurality of associated server data processing systems, such commands may be selectively generated and/or transferred to power-managed server data processing systems in alternative embodiments.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A method of managing power consumption of a plurality of server data processing systems, wherein said plurality of server data processing systems comprises a power management server data processing system and a power-managed server data processing system, said method comprising:

receiving power management data from said power-managed server data processing system at said power management server data processing system via a power management communication port;

determining an effective power consumption level of said non-power-managed server data processing system;

generating a power management command utilizing said power management data at said power management server data processing system and said effective power consumption level of said non-power-managed server data processing system; and transmitting said power management command from said power management server data processing system to said power-managed server data processing system utilizing said power management communication port, wherein said power management data comprises power management capability data.

2. The method of claim 1, further comprising:

causing data specifying a static power management priority level associated with said power-managed server data processing system to be stored within a storage element of said power management server data processing system, wherein said power management data comprises data specifying a dynamic power management priority level associated with said power-managed server data processing system; and generating said power management command utilizing said static power management priority level and said dynamic power management priority level.

3. The method of claim 1, wherein said power-managed server data processing system includes a first power-managed server data processing system, wherein said method further includes detecting a decoupling of said power management server data processing system from a second power-managed server data processing system of said plurality of server data processing systems;

determining an effective power consumption level of said second power-managed in response to said detecting; and generating said power management command utilizing said effective power consumption level.

* * * * *